(No Model.)
L. B. MELINS.
LOAD BINDER.
No. 331,421. Patented Dec. 1, 1885.
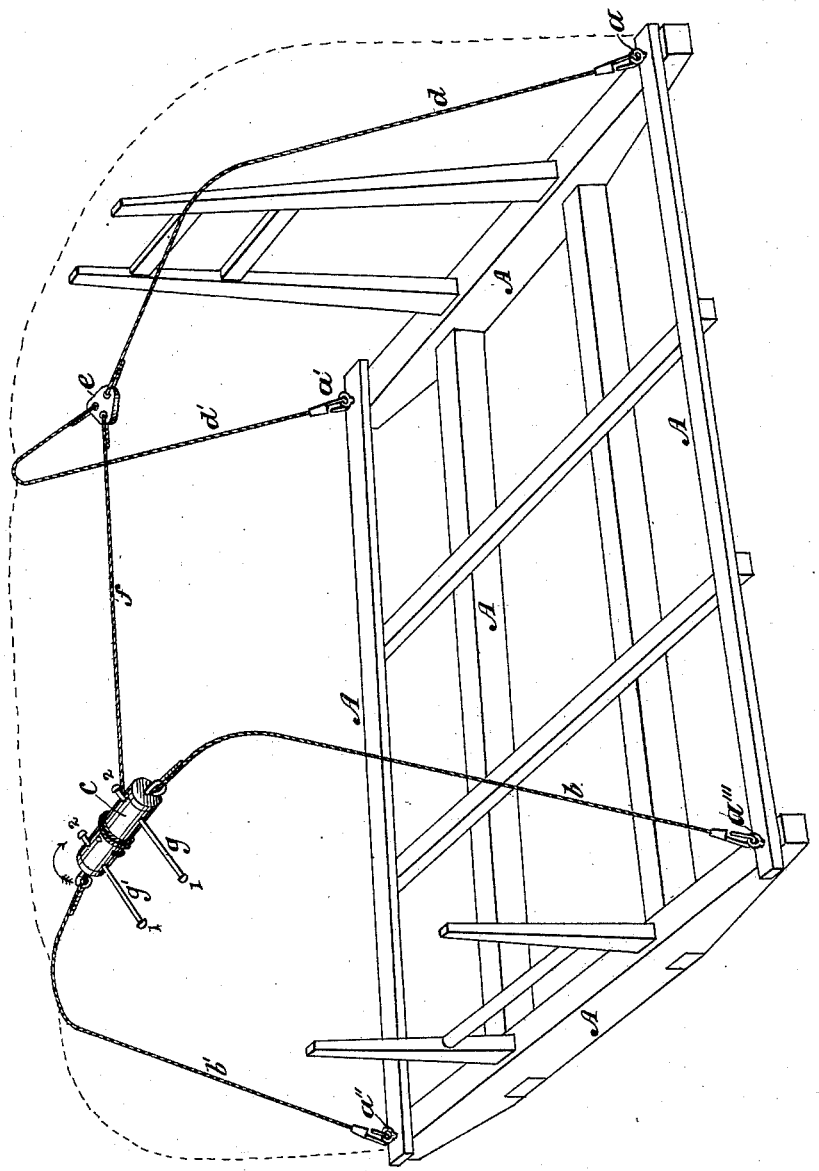
WITNESSES:
Daniel H. Driscoll
Edward T. Roche
INVENTOR
Lyman B. Melins
BY Gifford & Brown
ATTORNEYS

UNITED STATES PATENT OFFICE.

LYMAN B. MELINS, OF COPAKE, NEW YORK.

LOAD-BINDER.

SPECIFICATION forming part of Letters Patent No. 331,421, dated December 1, 1885.

Application filed April 8, 1885. Serial No. 161,520. (No model.)

*To all whom it may concern:*

Be it known that I, LYMAN B. MELINS, of Copake, Columbia county, State of New York, have invented a new and useful Improvement Applicable to the Securing of Loads, of which the following is a specification.

My invention consists in combining with the ropes by which a load is secured a windlass, hereinafter more fully described, which is pivoted to one pair of ropes at its ends, and is adapted to take up by being turned another rope extending from another portion of the load.

The figure of the drawing shows a perspective view of my load-binder.

In the drawing I have shown at A a frame, which is attached to a wagon for sustaining a load of hay or grain, or any other material. At each corner of this frame, as at a a' a'' a''', is secured a rope. The ropes b b', slightly inclined forward, are brought up the sides of the load and over its top, and their ends are respectively secured to the ends of a cylinder, preferably of wood, c. The ropes d d', slightly inclined backward, are brought up the sides of the load and over its top until their ends are secured together, preferably by a device similar to that shown at e in the drawing. At the junction of the ropes d and d' is secured a rope, f, which extends over the top of the load toward its rear until it reaches the cylinder c, to which it is secured. Through the cylinder c, near its ends, and at right angles with its axis, are passed two bars, g g', preferably of wood, which bars are provided with heads at each end, and are loosely fitted in the cylinder c, so that they may slide freely back and forth from end to end, but will be held in place by the heads.

The means employed for securing the ropes to the wagon-frame is preferably by a hook-and-eye attachment, the hook being secured to the rope and the eye to the frame; and it is preferable that the eye should be made too thick to enter the hook, except at one point, which may be accomplished by flattening the eye at that point. By this means the hook is prevented from becoming disengaged unintentionally when in use.

The contrivance which I have described is made use of in the following manner: Suppose a load of hay to have been placed upon the platform shown, and the ropes to have been brought into the position shown. The object to be accomplished is to tighten the ropes by means of the cylinder or windlass c in such manner as to bind the load and make it secure. It will be seen that the cylinder or windlass c will rest upon the top of the load of hay, and will be substantially pivoted by the ropes b b'. When in the position shown in the drawing, the ends 1 1 of the handles g g' will rest upon the top of the hay, and will prevent the turning of the cylinder, excepting in the direction of the arrow. A man now lays hold of the ends 1 1 of the handles g g' and turns the cylinder in the direction of the arrow one-half revolution. He then slides the handles through the cylinder until the ends 2 2 will be in the position where the ends 1 1 are shown in the drawing, and vice versa. When in this position the ends 2 2, resting on top of the load, will prevent the cylinder from turning back again. By repeatedly giving the cylinder half a rotation, and sliding the handles through each time, as described, the rope f will be gradually wound upon the cylinder c until the ropes are all drawn tight and the load is fully bound. When this is accomplished, the resting of the ends of the handles g g' upon the top of the load will lock the cylinder, so that it cannot turn backward, and no further securing of the ropes is required.

I am aware of Patent No. 299,506, dated June 3, 1884, granted to H. B. Banker, and Patent No. 210,527, dated December 3, 1878, granted to H. A. Harris, and I make no claim to anything set forth in either of the same.

What I claim as my invention, and desire to secure by Letters Patent, is—

1. In combination with a body or frame of a wagon, three or more ropes secured at various points of said body or frame, and a windlass secured to two of them at its ends, so as to turn upon the same, and secured to a third at its periphery, whereby when turned upon the first two the windlass will coil the third around its surface.

2. In combination with a wagon-frame or body, three or more ropes attached to the frame or body at various parts thereof, and a windlass composed of a cylinder, and a transverse bar movable longitudinally through the cylinder, the said cylinder being secured to two of the ropes at its ends and to the third rope upon its surface, substantially as described.

LYMAN B. MELINS.

Witnesses:
DANIEL H. DRISCOLL,
EDWARD T. ROCHE.